United States Patent
Hur et al.

(10) Patent No.: US 6,518,831 B1
(45) Date of Patent: Feb. 11, 2003

(54) BOOSTING CIRCUIT FOR HIGH VOLTAGE OPERATION

(75) Inventors: Young Do Hur, Chungheongbuk-do (KR); Seung Han Ok, Chungcheongbuk-do (KR)

(73) Assignee: Hynix Semiconductor Inc., Ichon (KR)

( * ) Notice: Subject to any disclaimer, the term of this patent is extended or adjusted under 35 U.S.C. 154(b) by 0 days.

(21) Appl. No.: 10/003,292

(22) Filed: Dec. 6, 2001

(30) Foreign Application Priority Data

Sep. 20, 2001 (KR) ........................................ 01-0058150

(51) Int. Cl.$^7$ ................................................ G05F 1/10
(52) U.S. Cl. ........................ 327/537; 327/535; 327/536
(58) Field of Search ................................. 327/536, 537, 327/538, 539, 540, 541, 534, 535; 365/189.09, 226, 241; 363/59, 60

(56) References Cited

U.S. PATENT DOCUMENTS

| | | | | |
|---|---|---|---|---|
| 5,889,664 A | * | 3/1999 | Oh | ................................ 363/60 |
| 5,920,226 A | * | 7/1999 | Mimura | ....................... 327/537 |
| 5,999,009 A | * | 12/1999 | Mitsui | ......................... 324/765 |
| 6,011,743 A | | 1/2000 | Khang | ......................... 365/226 |
| 6,184,668 B1 | | 2/2001 | Nojima et al. | ............... 323/299 |
| 6,198,342 B1 | | 3/2001 | Kawai | .......................... 327/536 |
| 6,212,107 B1 | | 4/2001 | Tsukada | ................ 365/189.09 |
| 6,177,828 B1 | | 6/2001 | Kang et al. | .................. 327/536 |

FOREIGN PATENT DOCUMENTS

| | | | | |
|---|---|---|---|---|
| JP | 08-063961 | 8/1996 | ......... | G11C/11/407 |
| JP | 2001-036009 | 9/2001 | ........... | H01L/27/04 |

* cited by examiner

*Primary Examiner*—Tuan T. Lam
*Assistant Examiner*—Hiep Nguyen
(74) *Attorney, Agent, or Firm*—Jacobson Holman PLLC

(57) ABSTRACT

A boosting circuit for a high voltage operation in a semiconductor memory device for preventing a transistor of a high voltage pump circuit from being destroyed due to an excessive bootstrap voltage in a pumping operation, by controlling the operation of the high voltage pump circuit according to a signal detecting that the bootstrap voltage of the high voltage pump circuit has increased above a predetermined level.

5 Claims, 8 Drawing Sheets

BOOSTING CIRCUIT FOR HIGH VOLTAGE OPERATION

BACKGROUND OF THE INVENTION

1. Field of the Invention

The present invention relates to a boosting circuit for a high voltage operation in a semiconductor memory device, and in particular to an improved boosting circuit for a high voltage operation which can prevent a transistor of a high voltage pump circuit from being destroyed due to an excessive bootstrap voltage in a pumping operation, by controlling the operation of the high voltage pump circuit according to a signal which detects when the bootstrap voltage of the high voltage pump circuit has increased above a predetermined level.

2. Description of the Background Art

In general, the DRAM is a random access memory for writing or reading data to/from a memory cell having one transistor and one capacitor. When a RAS bar signal /RAS which is a row address strobe signal is activated, the DRAM decodes an inputted row address to drive a selected word line.

Since the cell transistor composing the memory cell uses an NMOS, the DRAM includes a word line driving VPP generator for generating a potential of a power voltage VCC+a threshold voltage Vtn+$\Delta$V by considering a voltage loss due to the threshold voltage Vtn.

That is, a PMOS transistor successfully transmits a high potential, but it is difficult to transmit a low potential below the threshold voltage. An NMOS transistor successfully transmits a low potential, but it is difficult to transmit a potential higher than a potential which is lower than a gate potential by the threshold voltage. Therefore, when the NMOS transistor is used to decrease a size of the device or prevent a latch-up, a potential higher than a high potential transmitted to a gate of the NMOS transistor by at least the threshold voltage should be applied to successfully transmit the high potential. As a result, the high voltage VPP having a higher potential than the power voltage VCC is required to drive the word line of the DRAM.

Figure 1:
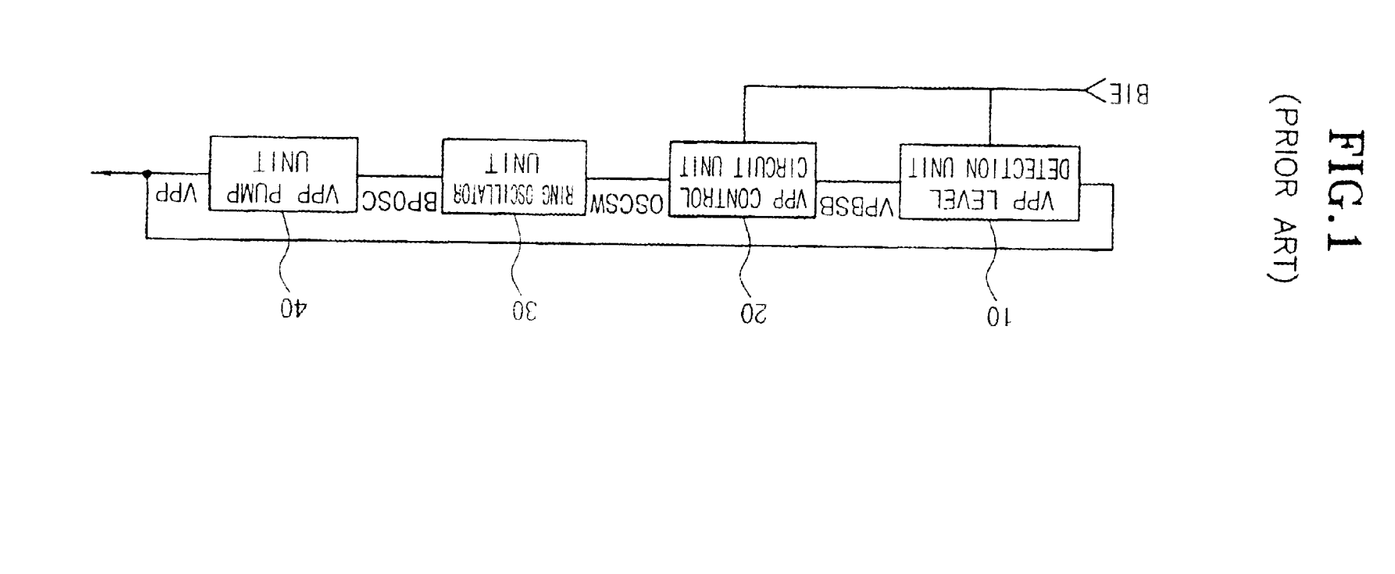
FIG. 1 is a block diagram illustrating a conventional boosting circuit for a high voltage operation.

FIG. 1 is a block diagram illustrating a conventional boosting circuit for a high voltage operation. Referring to FIG. 1, the conventional boosting circuit includes a VPP level detecting unit 10, a VPP control circuit unit 20, a ring oscillator unit 30 and a VPP pump unit 40.

When an operation control signal BIE indicating that a high voltage operation mode has a high level, the VPP level detecting unit 10 compares the high voltage VPP with a reference voltage Vref, and outputs a signal VPBSB upon detecting that the high voltage VPP has reached a target value. Here, when the high voltage VPP is higher than the reference voltage Vref, the output signal VPBSB has a low level, thus preventing a VPP pumping operation. When the high voltage VPP is lower than the reference voltage Vref, the output signal VPBSB has a high level, thus performing the VPP pumping operation.

The VPP control circuit unit 20 receives the output signal VPBSB from the VPP level detecting unit 10 and the operation control signal BIE, and generates a signal OSCSW for controlling the operation of the ring oscillator unit 30. When the output signal VPBSB from the VPP level detecting unit 10 and the operation control signal BIE have a high level, the VPP control circuit unit 20 generates the high level output signal OSCSW to operate the ring oscillator unit 30.

When any of the output signal VPBSB from the VPP level detecting unit 10 and the operation control signal BIE has a low level, the output signal OSCSW has a low level so as not to operate the ring oscillator unit 30.

When the output signal OSCSW from the VPP control circuit unit 20 has a high level, the ring oscillator unit 30 performs an oscillation operation to generate a pulse signal BPOSC having a predetermined period. When the output signal OSCSW from the VPP control circuit unit 20 has a low level, the ring oscillator unit 30 is not operated.

The VPP pump unit 40 pumps electric charges until the VPP voltage reaches the target value according to the pulse signal BPOSC from the ring oscillator unit 30.

That is, in the high voltage operation mode, the operation control signal BIE is enabled in a high level, and the ring oscillator unit 30 starts the operation. The VPP pump unit 40 is operated according to the pulse signal BPOSC from the ring oscillator unit 30, thereby increasing the VPP voltage. Thereafter, the VPP level detecting unit 10 detects the VPP voltage, prevents the VPP pumping operation when the detected value reaches the target value, and facilitates the VPP pumping a operation when the detected value does not reach the target value. By repeating the procedure, the VPP voltage maintains a constant potential.

Figure 2:
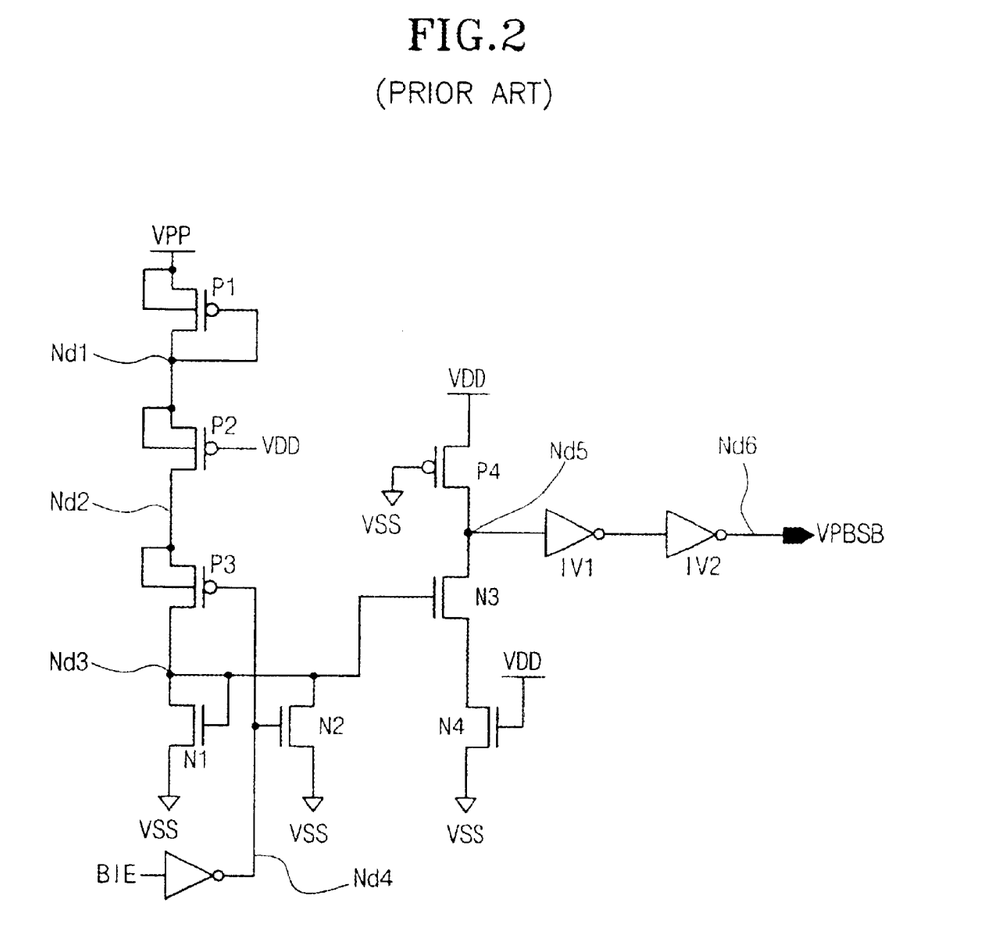
FIG. 2 is a circuit diagram illustrating a VPP level detecting unit of FIG. 1.

FIG. 2 is a circuit diagram illustrating the conventional VPP level detecting unit 10 of FIG. 1. The VPP level detecting unit 10 includes: a PMOS transistor P1 connected in a diode structure between the high voltage VPP and a node Nd1; a PMOS transistor P2 being connected between the node Nd1 and a node Nd2, having its gate connected to receive the power voltage VDD, and being turned on when a potential of the node Nd1 is higher than the power voltage VDD; a PMOS transistor P3 connected between the node Nd2 and a node Nd3, and turned on when the operation control signal BIE has a high level, for transmitting the signal of the node Nd2 to the node Nd3; an NMOS transistor N1 connected in a diode structure between the node Nd3 and a ground voltage VSS, and turned on when the signal of the node Nd3 is higher than the threshold voltage Vt, for discharging the voltage of the node Nd3 to the ground voltage VSS; and an NMOS transistor N2 connected between the node Nd3 and the ground voltage VSS, and turned on when the operation control signal BIE has a low level, thereby making the voltage at node Nd4 a high level, for discharging the voltage of the node Nd3 to the ground voltage VSS. In addition, the VPP level detecting unit 10 includes: a PMOS transistor P4 being connected between the power voltage VDD and a node Nd5, and having its gate connected to receive the ground voltage VSS; NMOS transistors N3 and N4 connected in series between the node Nd5 and the ground voltage VSS, and respectively controlled according to the signal of the node Nd3 and the power voltage VDD; and inverters IV1 and IV2 connected in series between the node Nd5 and a node Nd6 outputting an output signal VPBSB.

In the, VPP level detecting unit 10, when the operation control signal BIE has a high level, the PMOS transistor P3 is turned on, and the NMOS transistor N2 is turned off, to transmit 'VPP—threshold value Vt of PMOS transistors P1–P3' to the node Nd3. Here, when the VPP voltage exceeds 'power voltage VDD+|2Vtp|', the output signal VPBSB has a low level, thereby stopping the VPP pumping operation. Vtp denotes the threshold voltage of the PMOS transistors. Conversely, when the VPP voltage is lower than 'power voltage VDD+|2Vtp|', the output signal VPBSB has a high level, thereby performing a boosting operation for pumping the VPP voltage.

Figure 3:
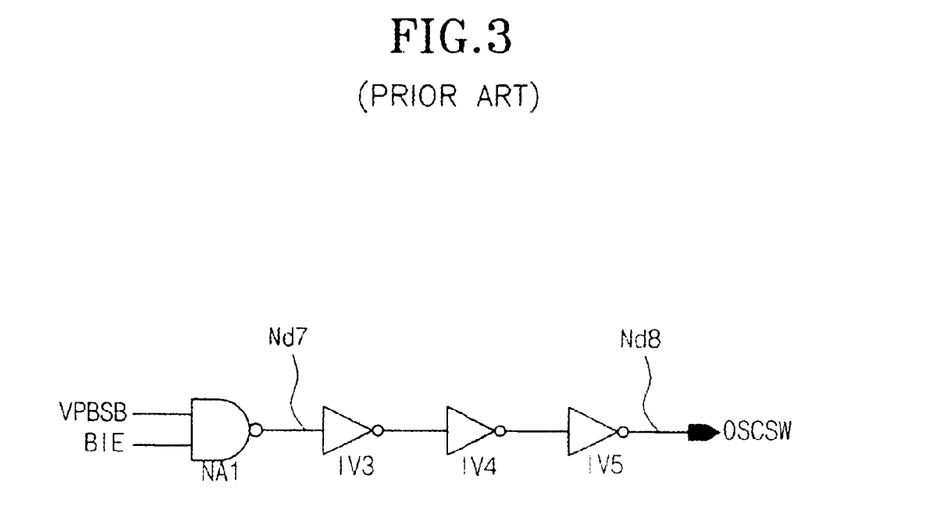
FIG. 3 is a circuit diagram illustrating a VPE control circuit unit of FIG. 1.

FIG. 3 is a circuit diagram illustrating the conventional VPP control circuit unit 20 of FIG. 1. The VPP control circuit unit 20 includes: a NAND gate NA1 for receiving the output signal VPBSB from the VPP level detecting unit 10 and the operation control signal BIE; and inverters IV3–IV5 connected in series between an output node Nd7 of the NAND gate NA1 and an output terminal Nd8 outputting the signal OSCSW.

When the output signal VPBSB from the VPP level detecting unit 10 and the operation control signal BIE have a high level, the VPP control circuit unit 20 generates the high level output signal OSCSW. When the output signal OSCSW has a high level, the ring oscillator unit 30 is operated to pump the VPP voltage.

Figure 4:
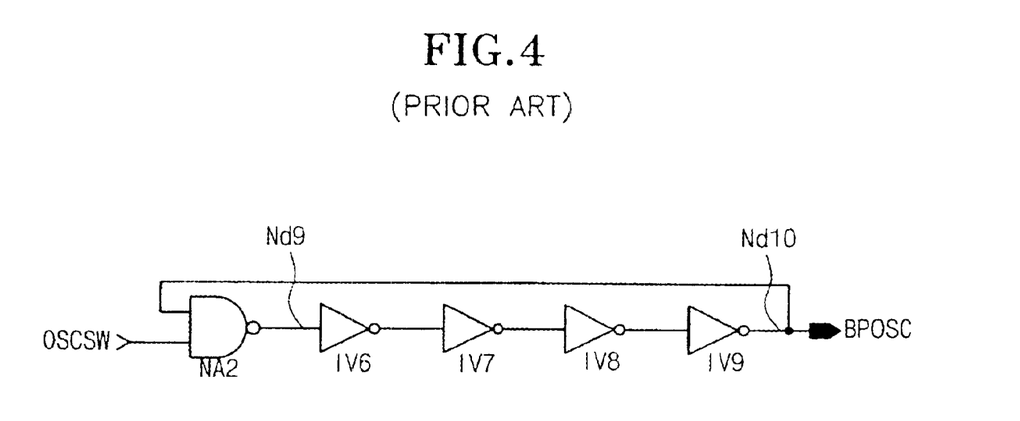
FIG. 4 is a circuit diagram illustrating a ring oscillator unit of FIG. 1.

FIG. 4 is a circuit diagram illustrating the conventional ring oscillator unit 30 of FIG. 1. The ring oscillator unit 30 includes: a NAND gate NA2 for receiving the output signal OSCSW from the VPP control circuit unit 20 and the output signal BPOSC; and inverters IV6–IV9 connected in series between an output node Nd9 of the NAND gate NA2 and an output terminal Nd10 outputting the signal BPOSC.

When the output signal OSCSW from the VPP control circuit unit 20 has a high level, the ring oscillator unit 30 performs the oscillation operation, thereby generating the pulse signal BPOSC having a predetermined period. When the output signal OSCSW from the VPP control circuit unit 20 has a low level, the ring oscillator unit 30 is not operated.

Figure 5:
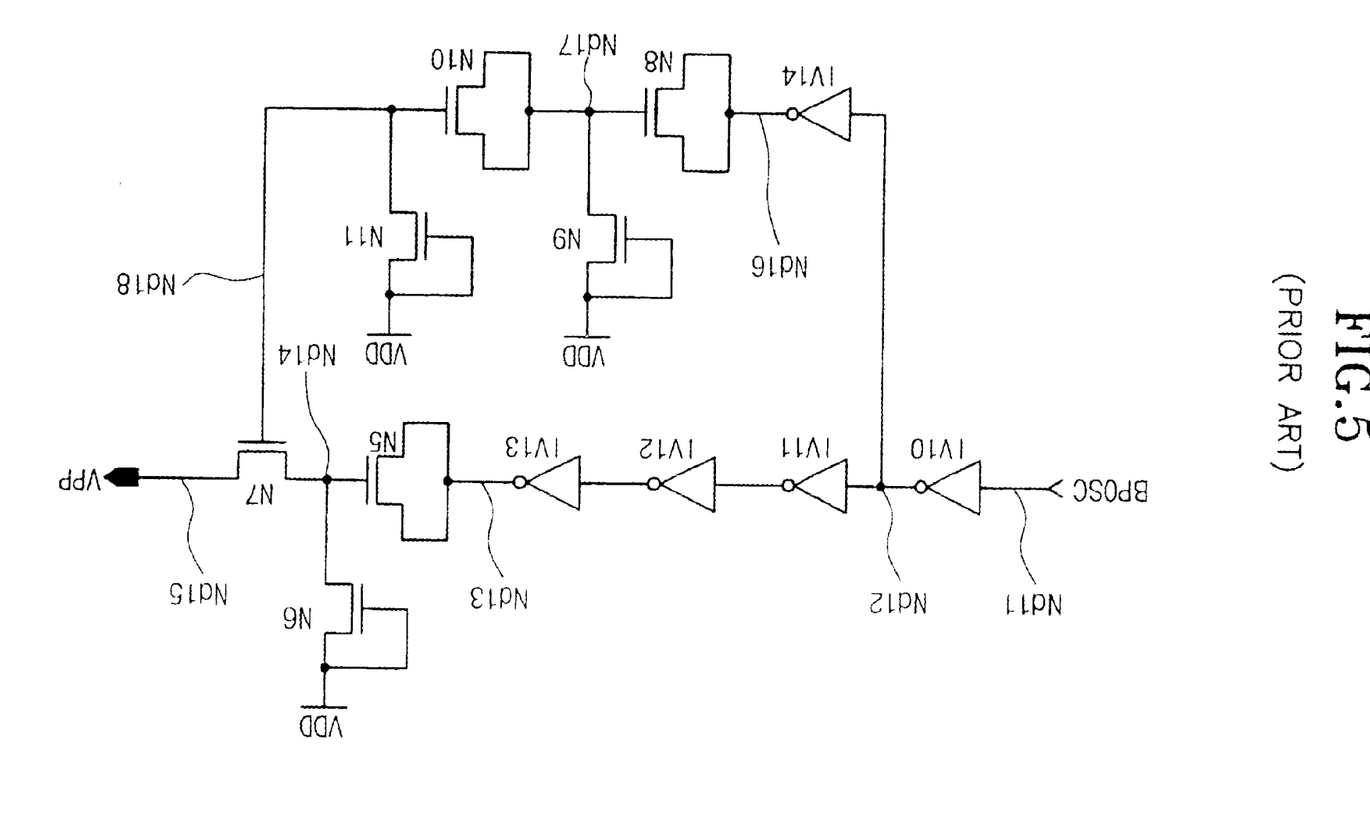
FIG. 5 is a circuit diagram illustrating a VPP pump unit of FIG. 1.

FIG. 5 is a circuit diagram illustrating the conventional VPP pump unit 40 of FIG. 1. The VPP pump unit 40 includes: an input node Nd11 for receiving the output signal BPOSC from the ring oscillator unit 30; an inverter IV10 for receiving the signal of the node Nd11, and outputting an inverted signal to a node Nd12; inverters IV11–IV13 connected in series between the node Nd12 and a node Nd13; an NMOS transistor N5 having its source and drain commonly connected to the node Nd13, having its gate connected to a node Nd14, and transmitting a bootstrap voltage to the node Nd14; an NMOS transistor N6 connected in a diode structure between the power voltage VDD and the node Nd14; an inverter IV14 connected between the output node Nd12 of the inverter IV10 and a node Nd16; an NMOS transistor N8 having its source and drain commonly connected to the node Nd16, having its gate connected to a node Nd17, and transmitting the bootstrap voltage to the node Nd17; an NMOS transistor N9 connected in a diode structure between the power voltage VDD and the node Nd17; an NMOS transistor N10 having its source and drain commonly connected to the node Nd17, having its gate connected to a node Nd18, and transmitting the bootstrap voltage to the node Nd18; an NMOS transistor N11 connected in a diode structure between the power voltage VDD and the node Nd18; and an NMOS transistor N7 ADD being connected between the node Nd14 and an output terminal Nd15 outputting the VPP voltage, and having its gate connected to receive the signal of the node Nd18.

When the VPP level detecting unit 10 does not exist, the VPP pump unit 40 instantaneously generates a potential of 2VDD according to the pulse signal BPOSC from the ring oscillator unit 30, thereby supplying electric charges to the VPP node.

In the conventional boosting circuit for the high voltage operation, the potential of the node Nd18 transmitted to the gate of the NMOS transistor N7 of the VPP pump unit 40 is maximally '3VDD −|2vtn|', and thus the NMOS transistor N7 may be destroyed. When the power voltage VDD is 5V, the potential of 14V seriously damages the reliability of the NMOS transistor N7.

SUMMARY OF THE INVENTION

Accordingly, it is an object of the present invention to provide a boosting circuit for a high voltage operation which can prevent a transistor of a high voltage pump circuit from being destroyed due to an excessive bootstrap voltage in a pumping operation, by controlling the operation of the high voltage pump circuit according to a signal detecting that the bootstrap voltage of the high voltage pump circuit has increased above a predetermined level.

In order to achieve the above-described object of the invention, there is provided a boosting circuit for a high voltage operation, including: a VPP pump unit for boosting a power voltage, and generating a high voltage; a first VPP level detecting unit for comparing the high voltage from the VPP pump unit with a reference voltage according to a high voltage operation signal, and outputting a resulting signal; a second VPP level detecting unit for receiving the highest voltage boosted in the VPP pump unit according to the high voltage operation signal, comparing the highest voltage with the reference voltage, and outputting a resulting signal; a VPP control circuit unit for receiving the output signal from the first VPP level detecting unit, the output signal from the second VPP level detecting unit and the high voltage operation signal, and generating a signal for controlling a VPP pumping operation; and a ring oscillator unit for performing an oscillation operation according to the output signal from the VPP control circuit unit, and generating a pulse signal having a predetermined period for controlling the operation of the VPP pump unit.

The first VPP level detecting unit generates a control signal for preventing the VPP pumping operation when the high voltage is higher than the reference voltage, and generates a control signal for pumping the VPP voltage when the high voltage is lower than the reference voltage.

The second VPP level detecting unit generates a control signal for preventing the VPP pumping operation when the voltage is higher than the reference voltage, and generates a control signal for pumping the VPP voltage when the voltage is lower than the reference voltage.

The VPP control circuit unit generates a signal for operating the ring oscillator unit when the output signal from the first VPP level detecting unit, the output signal from the second VPP level detecting unit and the operation control signal have a high level.

The ring oscillator unit generates a pulse signal having a predetermined period when the output signal from the VPP control circuit unit has a high level.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A boosting circuit for a high voltage operation in accordance with a preferred embodiment of the present invention will now be described in detail with reference to the accompanying drawings.

In the following description, the same drawing reference numerals are used for the same elements even in different drawings, and explanations thereof will be omitted.

Figure 6:
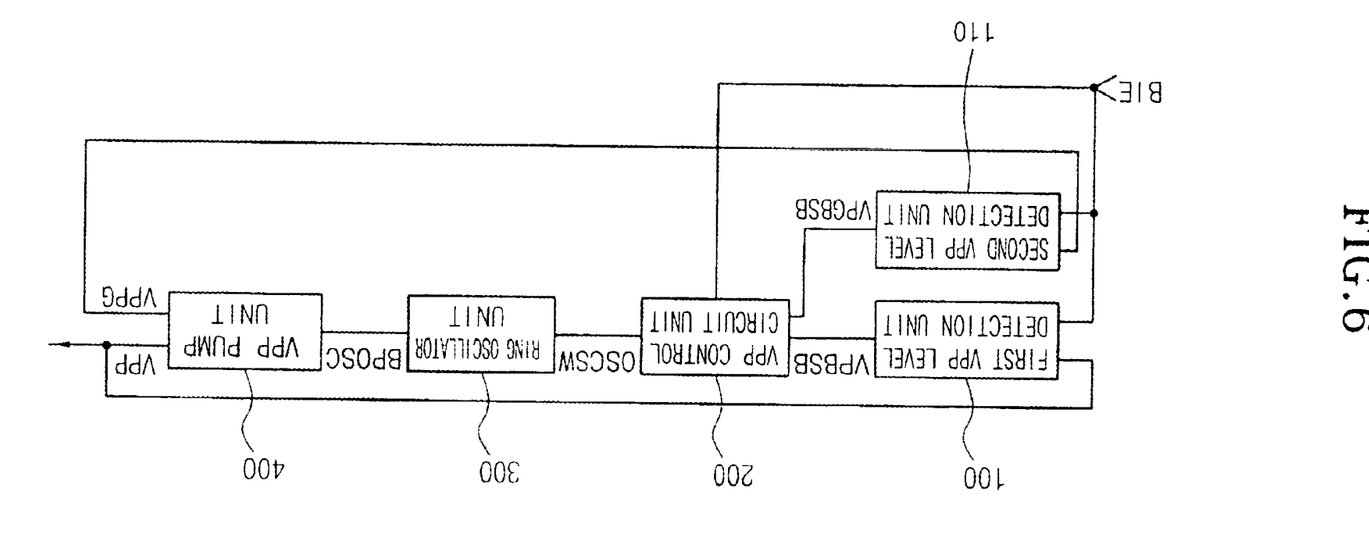
FIG. 6 is a block diagram illustrating a boosting circuit for a high voltage operation in accordance with the present invention.

FIG. 6 is a block diagram illustrating the boosting circuit for the high voltage operation in accordance with the present invention. Referring to FIG. 6, the boosting circuit includes a first VPP level detecting unit 100, a second VPP level detecting unit 110, a VPP control circuit unit 200, a ring oscillator unit 300 and a VPP pump unit 400. That is, the second VPP level detecting unit 110, the VPP control circuit unit 200 and the VPP pump unit 400 are added to or varied as compared with the boosting circuit of FIG. 1.

When an operation control signal BIE indicates that a high voltage operation mode has a high level, the first VPP level detecting unit 100 compares a high voltage VPP with a reference voltage Vref, and outputs a signal VPBSB upon detecting that the high voltage VPP has reached a target value. Here, when the high voltage VPP is higher than the reference voltage Vref, the output signal VPBSB has a low level, thus preventing a VPP pumping operation. When the high voltage VPP is lower than the reference voltage Vref, the output signal VPBSB has a high level, thus pumping the VPP voltage.

When the operation control signal BIE has a high level, the second VPP level detecting unit 110 receives a highest voltage VPPG generated in the VPP pump unit 400, compares the highest voltage VPPG with the reference voltage Vref, and outputs a resulting signal VPGBSB. Here, when the voltage VPPG is higher than the reference voltage Vref, the output signal VPGBSB has a low level, thus preventing the VPP pumping operation. When the voltage VPPG is lower than the reference voltage Vref, the output signal VPGBSB has a high level to pump the VPP voltage.

The VPP control circuit unit 200 receives the output signals VPBSB and VPGBSB from the first and second VPP level detecting units 100 and 110, and the operation control signal BIE, and generates a signal OSCSW for controlling the operation of the ring oscillator unit 300. When the output signals VPBSB and VPGBSB from the first and second VPP level detecting units 100 and 110 and the operation control signal BIE have a high level, the VPP control circuit unit 200 generates the high level output signal OSCSW to operate the ring oscillator unit 300. When any of the output signals VPBSB and VPGBSB from the first and second VPP level detecting units 100 and 110 and the operation control signal BIE has a low level, the output signal OSCSW has a low level so as not to operate the ring oscillator unit 300.

When the output signal OSCSW from the VPP control circuit unit 200 has a high level, the ring oscillator unit 300 performs an oscillation operation to generate a pulse signal BPOSC having a predetermined period. When the output signal OSCSW from the VPP control circuit unit 200 has a low level, the ring oscillator unit 300 is not operated.

The VPP pump unit 400 pumps electric charges until the VPP voltage reaches the target value according to the pulse signal BPOSC from the ring oscillator unit 300. Here, the output signal VPPG is a voltage signal boosted to a highest value by a bootstrap operation of the VPP pump unit 400.

In the high voltage operation mode, the operation control signal BIE is enabled in a high level, and the ring oscillator unit 300 starts the operation. The VPP pump unit 400 is operated according to the pulse signal BPOSC from the ring oscillator unit 300, thereby increasing the VPP voltage.

Thereafter, when the operation control signal BIE has a high level, the first VPP level detecting unit 100 detects the VPP voltage. When the detected value reaches the target value, the first VPP level detecting unit 100 prevents the VPP pumping operation. When the detected value does not reach the target value, the first VPP level detecting unit 100 generates the control signal VPBSB for boosting the VPP voltage according to the pumping operation.

When the operation control signal BIE has a high level, the second VPP level detecting unit 110 receives the highest voltage VPPG generated in the VPP pump unit 400. When a level of the voltage VPPG is excessively increased over the reference voltage Vref, the second VPP level detecting unit 110 generates the low output signal VPGBSB to stop the VPP pumping operation. In other cases, the output signal has a high level.

When the output signal VPBSB from the first VPP level detecting unit 100, the output signal VPGBSB from the second VPP level detecting unit 110, and the operation control signal BIE have a high level, the VPP control circuit unit 200 operates the ring oscillator unit 300 so that the VPP pump unit 400 can pump the VPP voltage. Conversely, when any of the output signal VPBSB from the first VPP level detecting unit 100, the output signal VPGBSB from the second VPP level detecting unit 110, and the operation control signal BIE has a low level, the VPP control circuit unit 200 stops the operation of the ring oscillator unit 300 so that the VPP pump unit 400 cannot pump the VPP voltage.

By repeating the procedure, the VPP voltage maintains a constant potential, and transistors of the VPP pump unit 400 are not destroyed due to excessive pumping of the VPP voltage.

Figure 7:
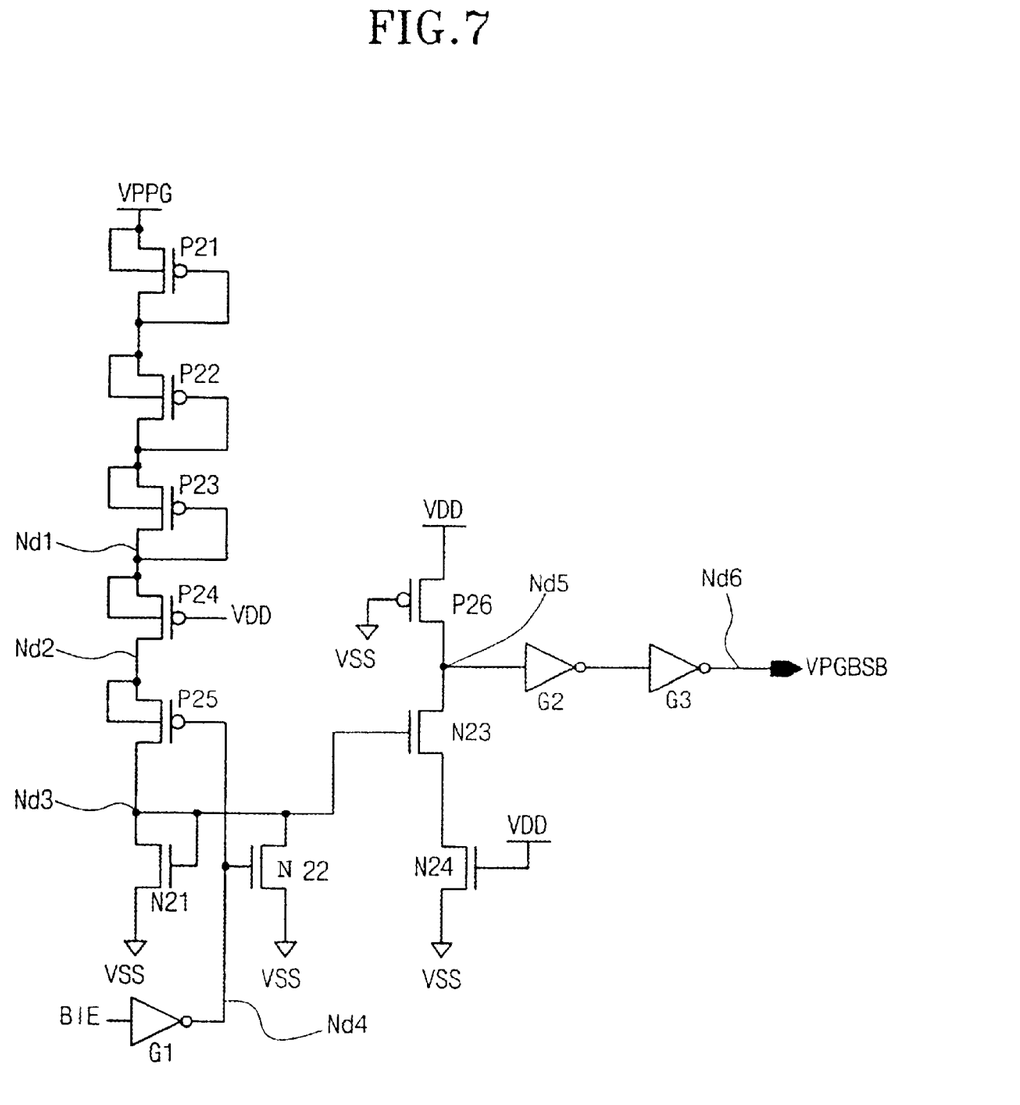
FIG. 7 is a circuit diagram illustrating a second VPP level detecting unit of FIG. 6.

FIG. 7 is a circuit diagram illustrating the second VPP level detecting unit 110 of FIG. 6. As shown in FIG. 7, the second VPP level detecting unit 110 includes: PMOS transistors P21–P23 serially connected in a diode structure between the output voltage VPPG from the VPP pump unit 400 and a node Nd1; a PMOS transistor P24 being connected between the node Nd1 and a node Nd2, having its gate connected to receive the power voltage VDD, and being turned on when a potential of the node Nd1 is higher than the power voltage VDD; a PMOS transistor P25 connected between the node Nd2 and a node Nd3, and turned on when the operation control signal BIE has a high level, for transmitting the signal of the node Nd2 to the node Nd3; an NMOS transistor N21 connected in a diode structure between the node Nd3 and a ground voltage VSS, and turned on when.the the signal of the node Nd3 is higher than the threshold voltage Vt, for discharging the voltage of the node Nd3 to the ground voltage VSS; and an NMOS transistor N22 connected between the node Nd3 and the ground voltage VSS, and turned on when the operation control signal BIE. has a low level, for discharging the voltage of the node Nd3 to the ground voltage VSS. In addition, the second VPP level detecting unit 110 includes: a PMOS transistor P26 being connected between the power voltage VDD and a node Nd5, and having its gate connected to receive the ground voltage VSS; NMOS transistors N23 and N24 connected in series between the node Nd5 and the ground voltage VSS, and respectively controlled according to the signal of the node Nd3 and the power voltage VDD; and inverters G2 and G3 connected in series between the node Nd5 and a node N6 outputting an output signal VPGBSB.

In the second VPP level detecting unit 110, when the operation control signal BIE has a high level, the PMOS if transistor P25 is turned on, and the NMOS transistor N22 is turned off. Here, when a level of the voltage VPPG from the VPP pump unit 400 is over 2VDD, the output signal VPGBSB has a low level. At this time, a sensing level is decided according to a magnitude of the PMOS transistors P21–P24. That is, when the level of the voltage VPPG is excessively increased, the output signal VPGBSB has a low level, thus stopping the boosting operation by the VPP pumping. When the voltage VPPG is below 2VDD the output signal VPGBSB has a high level to-perform the boosting operation for pumping the VPP voltage.

The boosting circuit of the present invention decides to start/stop the operation according to the sensing result of the two output voltages VPP and VPPG from the VPP pump unit 400, which is done differently from the conventional boosting circuit.

Figure 8:
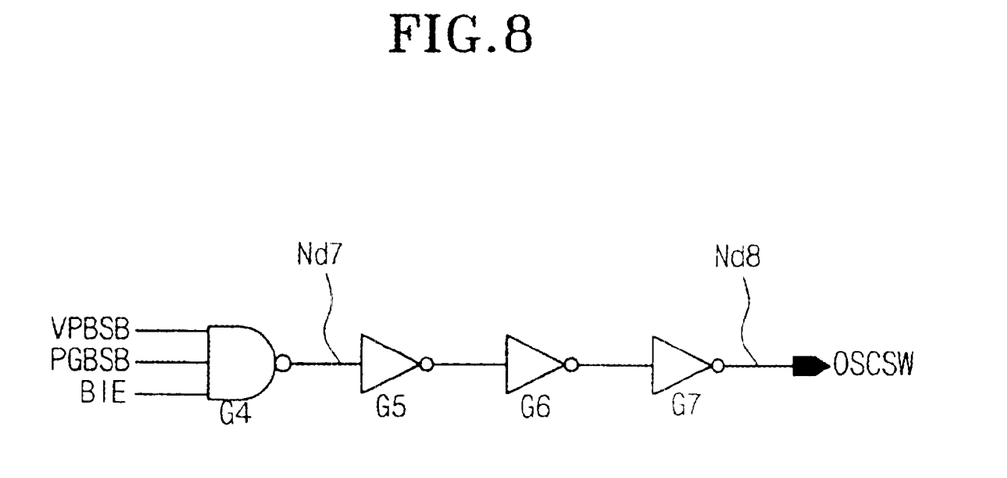
FIG. 8 is a circuit diagram illustrating a VPP control circuit unit of FIG. 6.

FIG. 8 is a circuit diagram illustrating the VPP control circuit unit 200 of FIG. 6. The VPP control circuit unit 200 includes: a NAND gate G4 for receiving the output signals VPBSB and VPGBSB from the first and second VPP level detecting units 100 and 110, and the operation control signal BIE; and inverters G5–G7 connected in series between an output node Nd7 of the NAND gate G4 and an output terminal Nd8 outputting the signal OSCSW.

When the output signals VPBSB and VPGBSB from the first and second VPP level detecting units 100 and 110 and the operation control signal BIE have a high level, the VPP control circuit unit 200 generates the high level output signal OSCSW. When the output signal OSCSW has a high level, the ring oscillator unit 300 is operated to pump the VPP voltage. Conversely, when any of the output signals VPBSB and VPGBSB from the first and second VPP level detecting units 100 and 110 and the operation control signal BIE has a low level, the output signal OSCSW has a low level. Accordingly, the operation of the ring oscillator unit 300 is stopped so as not to pump the VPP voltage.

The present invention may use a conventional ring oscillator unit such as that shown in FIG. 4. As shown, the ring oscillator unit 300 includes: a NAND gate NA2 for receiving the output signal OSCSW from the VPP control circuit unit 200 and the output signal BPOSC; and inverters IV6–IV9 connected in series between an output node Nd9 of the NAND gate NA2 and an output terminal Nd10 outputting the signal BPOSC.

When the output signal OSCSW from the VPP control circuit unit 200 has a high level, the ring oscillator unit 300 performs the oscillation operation, thereby generating the pulse signal BPOSC having a predetermined period. When the output signal OSCSW from the VPP control circuit unit 200 has a low level, the ring oscillator unit 300 is not operated.

Figure 9:
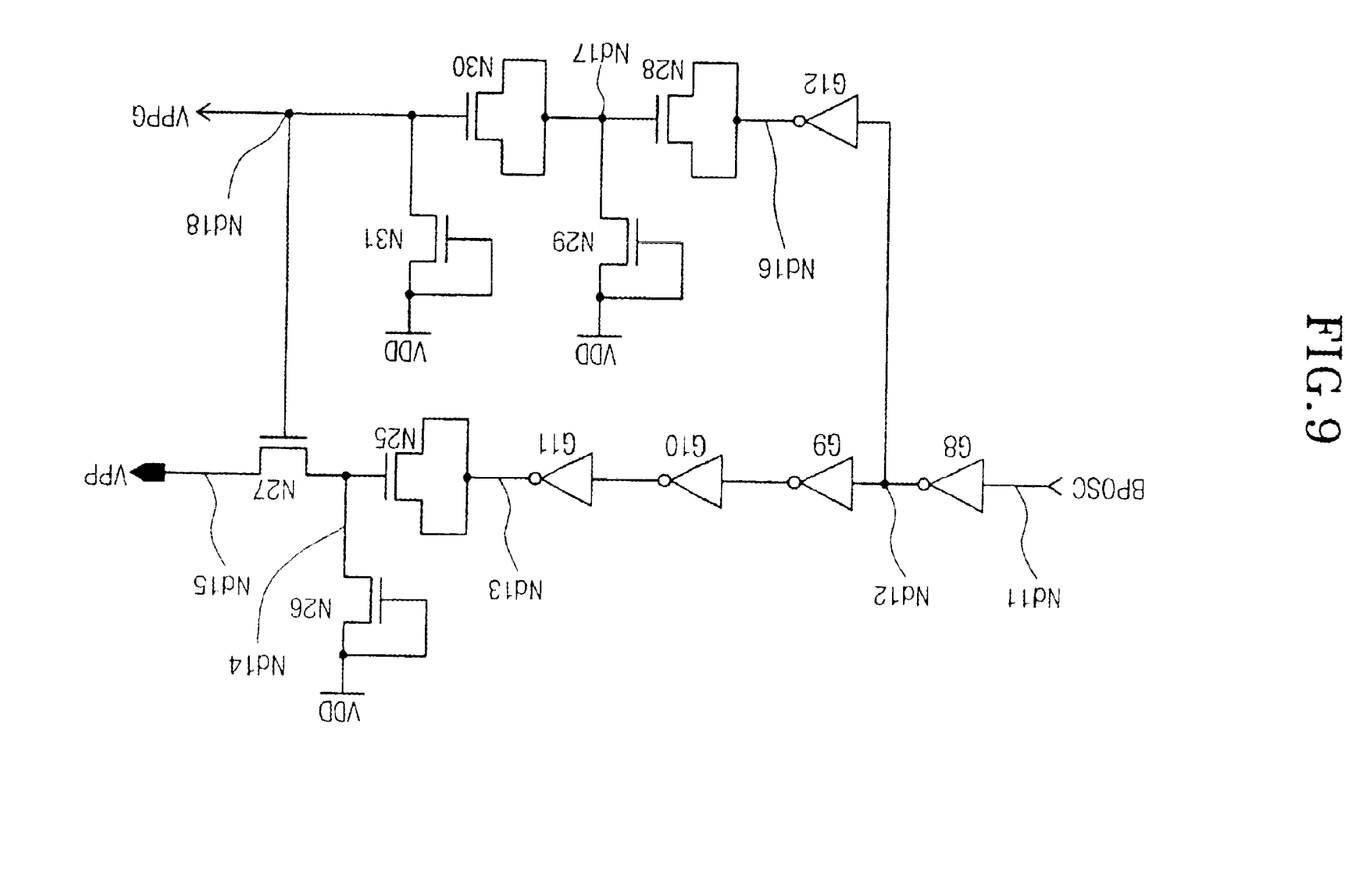
FIG. 9 is a circuit diagram illustrating a VPP pump unit of FIG. 6.

FIG. 9 is a circuit diagram illustrating the VPP pump unit 400 of FIG. 6. As illustrated in FIG. 9, the VPP pump unit 400 includes: an input node Nd11 for receiving the output signal BPOSC from the ring oscillator unit 300; an inverter G8 for receiving the signal of the node Nd11, and outputting an inverted signal to a node Nd12; inverters G9–G11 connected in series between the node Nd12 and a node Nd13; an NMOS transistor N25 having its source and drain commonly connected to the node Nd13, having its gate connected to a node Nd14, and transmitting a bootstrap voltage to the node Nd14; an NMOS transistor N26 connected in a diode structure between the power voltage VDD and the node Nd14; an inverter G12 connected between the output node Nd12 of the inverter G8 and a node Nd16; an NMOS transistor N28 having its source and drain commonly connected to the node Nd16, having its gate connected to a node Nd17, and transmitting the bootstrap voltage to the node Nd17; an NMOS transistor N29 connected in a diode structure between the power voltage VDD and the node Nd17; an NMOS transistor N30 having its source and drain commonly connected to the node Nd17, having its gate connected to a node Nd18 outputting the voltage VPPG, and transmitting the bootstrap voltage to the node Nd18; an NMOS transistor N31 connected in a diode structure between the power voltage VDD and the node Nd18; and an NMOS transistor N27 being connected between the node Nd14 and an output terminal Nd15 outputting the voltage VPP, and having its gate connected to receive the signal of the node Nd18.

In the VPP pump unit.400, when the output signal BPOSC from the ring oscillator unit 300 has a high level, the node Nd13 has a high level, to bootstrap the potential of the node Nd14 by the NMOS transistor N25. Here, the potential of the node Nd14 is 'VDD–Vtn' according to the power voltage VDD supplied through the NMOS transistor N26, but varied to '2VDD –Vtn' by the bootstrap operation of the NMOS transistor N25. On the other hand, the potential of the node Nd17 is 'VDD –Vtn' according to the power voltage VDD supplied through the NMOS transistor N29, but varied to '2VDD –Vtn' by the bootstrap operation of the NMOS transistor N28. Since the potential of the node Nd17 is '2VDD –Vtn', the potential of the node Nd18 outputting the voltage VPPG is '3 VDDVtn' bootstrapped by the NMOS transistor N30. Therefore, the VPP voltage outputted to the node Nd15 is '2VDD'.

As a result, the sensing level of the second VPP level detecting unit 110 is '2VDD', and thus becomes the potential of the VPPG, which is lower than '3 VDD–vtn|'. However, the potential can remove drop of the threshold voltage Vt, thereby achieving reliability and efficiency.

As discussed earlier, in accordance with the present invention, the pumping operation is controlled by detecting that the bootstrap voltage of the high voltage pump circuit is increased over a predetermined level, thereby preventing the transistors of the VPP pump circuit from being destroyed due to the excessive bootstrap voltage in the pumping operation. Therefore, the boosting operation is stably performed by achieving reliability of the boosting circuit in a burn-in mode which is a high voltage mode.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A boosting circuit for a high voltage operation in a semiconductor memory device, comprising:

a VPP pump unit for boosting a power voltage, and generating a first voltage, and a second voltage wherein the second voltage is higher than, the first voltage;

a first VPP level detecting unit for comparing the first voltage from the VPP pump unit with a first reference voltage level in response to an operation control signal and outputting a resulting signal;

a second VPP level detecting unit for comparing the second voltage with a second, reference voltage in response to the operation control signal and outputting a resulting signal;

a VPP control circuit unit for receiving the output signal from the first VPP level detecting unit, the output signal from the second VPP level detecting unit and the operation control signal, and generating a. signal for controlling the VPP pumping operation; and a ring oscillator unit for performing an oscillation operation according to the output signal from the VPP control circuit unit, and generating a pulse signal having a predetermined period for controlling operation of the VPP pump unit.

2. The circuit according to claim 1, wherein the resulting signal of the first VPP level detecting unit prevents the VPP pumping operation when the first voltage is higher than the first reference voltage, and pumps the VPP voltage when the first voltage is lower than the first reference voltage.

3. The circuit according to claim 1, wherein the resulting signal of the second VPP level detecting unit prevents the VPP pumping operation when the second voltage is higher than the second reference voltage, and pumps the VPP voltage when the second voltage is lower than the second reference voltage.

4. The circuit according to claim 1, wherein the VPP control circuit unit generates a signal for operating the ring oscillator unit when the resulting signal from the first VPP level detecting unit, the resulting signal from the second VPP level detecting unit and the operation control signal have a high level.

5. The circuit according to claim 1, wherein the ring oscillator unit generates a pulse signal having a predetermined period when the output signal from the VPP control circuit unit has a high level.

* * * * *